United States Patent
Yoshizawa et al.

(10) Patent No.: US 7,816,059 B2
(45) Date of Patent: Oct. 19, 2010

(54) HOLOGRAM RECORDING MATERIAL, HOLOGRAM RECORDING MEDIUM AND HOLOGRAM RECORDING METHOD

(75) Inventors: Hisea Yoshizawa, Kanagawa (JP); Jiro Minabe, Kanagawa (JP); Yasuhiro Ogasawara, Kanagawa (JP); Katsunori Kawano, Kanagawa (JP); Kazuhiro Hayashi, Kanagawa (JP); Shin Yasuda, Kanagawa (JP); Koichi Haga, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 310 days.

(21) Appl. No.: 11/708,535

(22) Filed: Feb. 21, 2007

(65) Prior Publication Data
US 2008/0013138 A1    Jan. 17, 2008

(30) Foreign Application Priority Data
Jul. 11, 2006    (JP) ............................. 2006-190530

(51) Int. Cl.
G03H 1/02    (2006.01)
(52) U.S. Cl. .................................. 430/1; 430/2; 359/3
(58) Field of Classification Search ........................ None
See application file for complete search history.

(56) References Cited

U.S. PATENT DOCUMENTS

| | | | |
|---|---|---|---|
| 6,337,111 B1 | 1/2002 | Ichihashi | |
| 7,582,392 B2 * | 9/2009 | Yoshizawa et al. ............. | 430/1 |
| 2003/0191240 A1 | 10/2003 | Berneth et al. | |
| 2004/0096776 A1 * | 5/2004 | Tanigawa et al. ......... | 430/281.1 |
| 2004/0166424 A1 | 8/2004 | Kaida et al. | |
| 2004/0191684 A1 | 9/2004 | Maruyama et al. | |
| 2005/0068594 A1 * | 3/2005 | Tomita et al. ................... | 359/3 |
| 2005/0206984 A1 | 9/2005 | Kawano et al. | |
| 2005/0208256 A1 | 9/2005 | Yoshizawa et al. | |
| 2005/0208387 A1 | 9/2005 | Minabe et al. | |
| 2005/0228153 A1 | 10/2005 | Minabe et al. | |
| 2005/0265134 A1 | 12/2005 | Minabe et al. | |
| 2006/0057467 A1 * | 3/2006 | Takizawa ....................... | 430/1 |
| 2007/0117027 A1 * | 5/2007 | Yoshizawa et al. ............. | 430/1 |
| 2008/0013138 A1 | 1/2008 | Yoshizawa et al. | |
| 2008/0176146 A1 * | 7/2008 | Tomita et al. ................... | 430/2 |
| 2008/0199782 A1 * | 8/2008 | Yoshizawa et al. ............. | 430/2 |

FOREIGN PATENT DOCUMENTS

CN    A-1728246    2/2006

(Continued)

OTHER PUBLICATIONS

Ubukata et al. "Phototactic mass transport in polymer films for micropatterning and alignment of functional materials", Adv. Mater., vol. 16(3) pp. 220-223 (Feb. 2004).*

(Continued)

*Primary Examiner*—Martin J Angebranndt
(74) *Attorney, Agent, or Firm*—Oliff & Berridge, PLC

(57) ABSTRACT

A hologram recording material is used for recording information by at least irradiation with light. The hologram recording material includes photoresponsive molecules, liquid crystal molecules, and particles having an average particle diameter of one tenth or less of a wavelength of light used in the information recording.

21 Claims, 1 Drawing Sheet

FOREIGN PATENT DOCUMENTS

| | | | |
|---|---|---|---|
| DE | 19620588 A1 | | 11/1997 |
| JP | A-11-237612 | | 8/1999 |
| JP | A-11-305036 | | 11/1999 |
| JP | A-2002-265541 | | 9/2002 |
| JP | 2003-084651 | * | 3/2003 |
| JP | B2 3451319 | | 7/2003 |
| JP | 2003-332199 | * | 11/2003 |
| JP | 2005-115361 | * | 4/2005 |
| JP | A-2007-171916 | | 7/2007 |
| WO | WO 02/44801 A2 | | 6/2002 |
| WO | 2006/101003 | * | 9/2006 |

OTHER PUBLICATIONS

Ubukata et al. "Surface relief grating in hybrid films composed of azobenzene polymer and liquid crystal molecule", Colloids and surfaces vol. 198-200 pp. 113-117 (2002).*

Tomita et al. "Volume holographic recording based on mass transpaort of nanoparticles doped in methacrylate photopolymers", Proc SPIE 5939 (9 pages) (on-line Sep. 1, 2005).*

Cloutier et al., "Measurement of permanent vectoral photoinduced anisotropy in azo-dye doped photoresist using polarization holography", J. Opt. A: Pure Appl. Opt. vol. 4 pp. S228-S234 (2002).*

Tomita et al., "Organic-nanoparticle dispersed photopolymers for volume holographic reocirding", 2005 IEEE conference on lasers and electrooptics, p. 156 (Jun. 2005).*

Suzuki et al. "Silica-nanoparticle-dispersed methacrylate photopolymers with net diffraction efficiency near 100%", ApII. OPt., vol. 43(10) pp. 2125-2129 (Apr. 2004).*

Suzuki et al "Diffraction properties of volume holograms . . ."Jpn. J. Appl. Phys., vol. 42, pt 2, No. 8A pp. L927-L929 (Aug. 2003).*

Yu et al., "Chiral Nematic Polymer Mixture Containing Crosslinker and Photosensitive Chiral Dopant: New Type of Materials with Tunable Photo-Optical Properties", Adv. Funct. Mater., vol. 12 No. 5, pp. 367-372 (May 2002).

Table 12.10$\delta_p^0$, The 5$^{th}$ Edition Chemical Handbook Basic Book II, published by Maruzen Co., Ltd., edited by the Chemical Society of Japan, issued Feb. 20, 2004.

Yoshizawa et al., "Azopolymer/liquid Crystal Complex for Polarization Holograms", Jap. J. Appl. Phys., vol. 46(6B), pp. 3840-3844 (Jul. 2007 on-line).

Hvilsted et al., "Azobenzene Side-Chain Liquid Crystalline Polyesters with Outstanding Optical Storage Properties", Tr. J. of Chem., vol. 22, pp. 33-45 (1998).

Helgert et al., Surface Relief Measurements in Side-Chain Azobenzene Polyesters with Different Substituents, Appl. Phys. B, vol. 72, pp. 429-433 (2001).

Prescher et al., "Synthesis of Liquid Crystalline Poly(meth) Acrylates With 4-Trifluoromethoxy-azobenzene Mesogenic Side-Groups", J. Fluor. Chem., vol. 74, pp. 185-189 (1995).

Office Action dated Apr. 8, 2009—U.S. Appl. No. 11/902,435.

Office Action dated Oct. 21, 2009—U.S. Appl. No. 11/902,435.

U.S. Office Action issued Apr. 22, 2010 in corresponding U.S. Appl. No. 11/902,435.

* cited by examiner

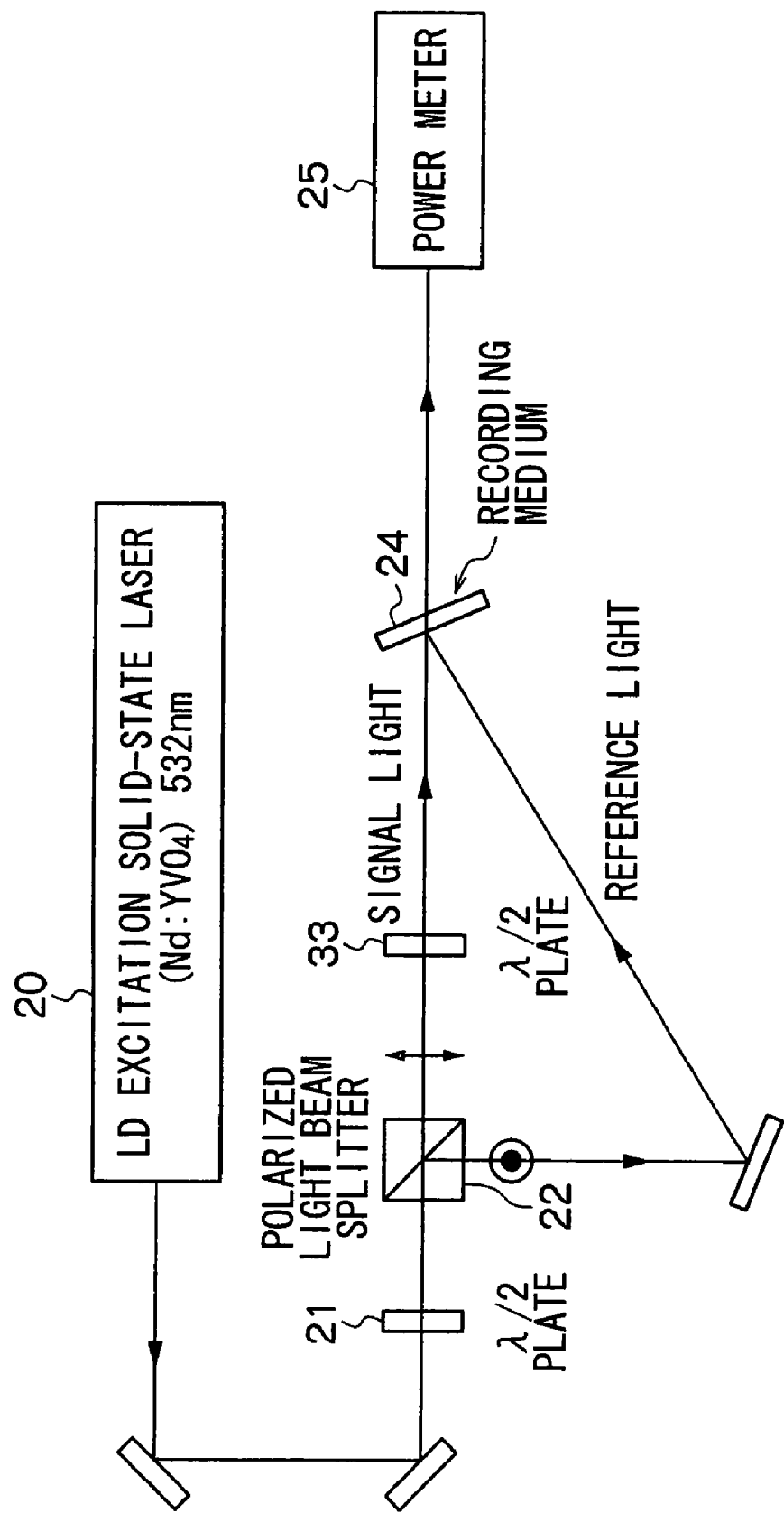

HOLOGRAM RECORDING MATERIAL, HOLOGRAM RECORDING MEDIUM AND HOLOGRAM RECORDING METHOD

CROSS-REFERENCE TO RELATED APPLICATION

This application claims priority under 35 USC 119 from Japanese patent Application No. 2006-190530

BACKGROUND

1. Technical Field

The invention relates to a hologram recording material suitable for recording large capacity information by making use of hologram recording, a hologram recording medium using the same and a hologram recording method using the hologram recording medium.

2. Related Art

In the holographic data storage, polarization can be recorded when, as a material for recording a hologram, a photochromic material such as a polymer material having, in a molecule thereof, an azobenzene skeleton whose orientation changes in trans-cis under irradiation of light (hereinafter occasionally referred to as "azo-polymer") is selected.

The polarization recording is a useful recording method characteristic to the hologram recording in which data can be locked for security and used to calculate. However, azopolymers or the like that is under study at present as a recording material for hologram recording media that can record the polarization, being reversible in a photoisomerization reaction thereof, cannot permanently keep the polarization recording; accordingly, it is under study as a rewritable material.

In the holographic data storage, there are a large need for write-once type hologram recording media where information once recorded is not lost, rather than rewritable hologram recording media because of its large capacity of recording.

As one that satisfies such needs, there is known a hologram recording medium that uses a photopolymerizable polymer recording material (so-called photopolymer) that can record information by making use of an irreversible reaction such as a polymerization reaction occurring upon light irradiation. However, in this type of the medium, the foregoing advantages cannot be obtained since the polarization recording cannot be carried out. Furthermore, when multiplex recording is applied, there is a disadvantage that the sensitivity significantly decreases as the recording is repeated.

SUMMARY

According to an aspect of the invention, a hologram recording material for recording information by at least irradiation with light includes photoresponsive molecules, liquid crystal molecules, and particles having an average particle diameter of one tenth or less of a wavelength of light used in the information recording.

BRIEF DESCRIPTION OF THE DRAWINGS

Embodiments of the present invention will be described in detail based on the following figures, wherein:

FIG. 1 is a schematic diagram showing an example of an optical recording and reproducing device used in an aspect of the invention.

DETAILED DESCRIPTION

<Hologram Recording Material and Hologram Recording Medium>

The hologram recording material (hereinafter, may be abbreviated as "recording material") according to an aspect of the invention may be used to record information at least by irradiating light, and includes a photoresponsive molecule, a liquid crystal molecule and particles having an average particle diameter of one tenth or less of the wavelength of the light used for recording information. Furthermore, the hologram recording medium (hereinafter, may be abbreviated as "recording medium") according to an aspect of the invention includes a recording layer including the recording material according to an aspect of the invention.

Accordingly, in the recording material/recording medium according to an aspect of the invention, deterioration in the recording characteristics due to light scattering is less significant not only in the beginning but also over time even when a combination of a photoresponsive molecule and a liquid crystal molecule is used. Furthermore, since the recording material/recording medium according to an aspect of the invention uses a combination of the photoresponsive molecule and the liquid crystal molecule, multiplex recording that makes use of polarization and is high in the sensitivity can be realized.

In a recording material in which photoresponsive molecules and liquid crystal molecules are simply mixed, liquid crystal molecules, which intrinsically tend to orient themselves in a particular direction, spontaneously orient themselves in a particular direction over time even if they are randomly oriented immediately after the preparation of the recording material. Accordingly, when light is irradiated to record information long after the preparation of the recording medium, spontaneously oriented liquid crystal molecules in the recording layer scatter the light. Accordingly, in order to record information similarly to the information recording immediately after the preparation of the recording medium, the intensity of irradiation light has to be increased. In addition, light is scattered to a region in the recording layer where information should not be recorded.

However, in an aspect of the invention, particles contained in the recording material physically inhibit the liquid crystal molecules from spontaneously orienting themselves. Accordingly, the deterioration with time of the recording characteristics such as mentioned above can be suppressed.

On the other hand, when the particles are contained in the recording material, the particles per se may scatter irradiated light for recording information, and thereby may deteriorate the recording characteristics from the beginning. Thus, not only in the hologram recording but also in optical recording, in which light is used to record information, addition of particles in the recording material is considered to be just disadvantageous. Therefore, such incorporation of particles is normally useless.

However, when the average particle diameter of the particles to be used is one tenth or less of the wavelength of the light used to record information, since the particle size is sufficiently small compared to the wavelength of the light, the light scattering attributable to particles can be inhibited. For instance, when an infrared laser having a wavelength of approximately 1000 nm is utilized, the average particle diameter of the particles may adequately be 100 nm or less and when a blue laser having a wavelength of approximately 400 nm is utilized, the average particle diameter of the particles may be 40 nm or less. The lower limit value of the particle diameter of the particles is not particularly restricted. However, from practical viewpoints such as easy production and availability, the lower limit value may be 1 nm or more. Furthermore, a narrower particle size distribution is preferable, and mono-dispersion is more preferable.

The average particle diameter of the particles in an aspect of the invention is obtained by measuring the maximum diameter of each of 10 particles observed with a transmission electron microscope (TEM), and calculating the average value thereof. The particle diameters may be determined by observing a section of the recording layer of the recording material or the recording medium with a TEM, or may be determined by measuring the particles themselves to be used for the preparation of the recording material.

On the other hand, the material of the particles is not particularly restricted. However, the material may be a material that neither chemically reacts with other materials contained in the recording material nor has catalytic activity. For instance, metal oxides such as silica and titanium oxide and resins may be utilized.

The content of liquid crystal molecules in the recording material is not particularly restricted. However, it is preferably 5% by weight or more, and more preferably 30% by weight or more. When the content is less than 5% by weight, sufficient diffraction efficiency cannot be obtained at the time of recording. An increase in liquid crystal molecules contained in the recording material accelerates spontaneous orientation of liquid crystal molecules. The spontaneous orientation is usually significant at a content of 5% by weight or more. However, in an aspect of the invention, since the particles as described above are contained as well in the recording material, the deterioration of the recording characteristics with time may be effectively suppressed even when the content of liquid crystal molecules contained in the recording material is 5% by weight or more.

The upper limit of the content of liquid crystal molecules in the recording material is not particularly restricted. However, from the balance with other components, a content of 80% by weight or less is practically preferable.

On the other hand, the blending ratio of particles to liquid crystal molecules in the recording material is preferably 0.01% by weight or more and more preferably 0.1% by weight or more. When the blending ratio is less than 0.01% by weight, progression of spontaneous orientation of the liquid crystal molecules cannot be prevented; accordingly, the recording characteristics may be deteriorated with time in some cases. The upper limit of the blending ratio is not particularly restricted. However, from the balance with other components, a blending ratio of 5% by weight or less is practically preferable.

Furthermore, though will be detailed below, as the liquid crystal molecules that are used in an aspect of the invention, any known liquid crystal molecules may be used. The liquid crystal molecules may be liquid crystal molecules that polymerize and/or crosslink upon application of external stimulation such as light or heat (hereinafter, referred to as "reactive liquid crystal molecules"; on the other hand, liquid crystal molecules that does not have such reactivity are referred to as "nonreactive liquid crystal molecule") may be used. However, the reactive liquid crystal molecules that are used in an aspect of the invention are preferably liquid crystal molecules that polymerize and/or form crosslink upon irradiation with light, and are more preferably liquid crystal molecules that polymerize and/or form crosslink upon irradiation with light having a wavelength to which the photoresponsive molecules are responsive.

When reactive liquid crystal molecule are used as the liquid crystal molecule, the fixability of information once recorded may be largely enhanced in comparison with a case where nonreactive liquid crystal molecules are used. Therefore, it is possible to provide a write-once type recording material and/or recording medium that can stably store information once recorded over a long time. Accordingly, in an aspect of the invention, the liquid crystal molecule to be used is preferably a reactive liquid crystal molecule.

Information recording in a recording material according to an aspect of the invention may be conducted by irradiating signal light and reference light simultaneously. The information recording may be multiplex information recording using modulation of the polarization direction of light.

However, information recording does not have to involve modulation of the polarization direction as a matter of course. For example, information recording may be conducted by using modulation of the amplitude or phase. Furthermore, when information is recorded by using the modulation of the polarization direction, information recording may be compatible with intensity modulation in which the polarization direction of the signal light and the polarization direction of the reference light are in parallel with each other or polarization modulation in which the polarization direction of the signal light and the polarization direction of the reference light are orthogonal to each other. When such hologram recording is carried out, the average particle diameter of the particles may be one tenth or less of the wavelength of the signal light.

Furthermore, when the liquid crystal molecules are reactive liquid crystal molecules, information recording and fixation in a recording material according to an aspect of the invention may be conducted in the manner described below. First, light (polarized light) that causes photoisomerization reaction of the photoresponsive molecules is irradiated to orient the photoresponsive molecules contained in the recording layer in a predetermined direction through the photoisomerization reaction. In this process, the reactive liquid crystal molecules present in the neighborhood of the photoresponsive molecules are oriented according to the orientation state of the photoresponsive molecules. When the liquid crystal molecules are nonreactive liquid crystal molecules, a single information recording process is basically completed at this stage).

Subsequently, external stimuli are applied to reactive liquid crystal molecules that are oriented according to the orientation state of the photoresponsive molecules so as to cause polymerization and/or crosslinking of the reactive liquid crystal molecules. Thereby, since the orientation of the reactive liquid crystal molecules that are oriented according to the orientation state of the photoresponsive molecules is fixed, information once recorded can be fixed.

When light having a wavelength to which a photoresponsive molecule is responsive is used as the external stimuli, the combination of the photoresponsive molecules and the reactive liquid crystal molecules, the amounts thereof, and the amount of the reaction initiator that is optionally used are determined such that the orientation of the molecules occurs in preference to the polymerization or crosslinking reaction. However, information recording and fixation may be conducted through the above-mentioned process.

When the reactive liquid crystal is used as the liquid crystal molecules, at the time of multiplex recording, the reactive liquid crystal molecules mainly play a function of fixing information once recorded and the photoresponsive molecules play a function of inducing alignment of reactive liquid crystal molecules and a function of securing the sensitivity. Accordingly, high-sensitivity multiplex recording using polarized light may be realized and information once recorded may be fixed.

When such a difference between the functions of the photoresponsive molecules and reactive liquid crystal molecules is considered, the content ratio of the photoresponsive molecules to the reactive liquid crystal molecules contained in the recording layer may be in the range of 1:9 to 9:1 by weight.

When the content ratio of the photoresponsive molecules to reactive liquid crystal molecules is outside of the above range, for example, when the ratio of the photoresponsive molecules to the reactive liquid crystal molecules is too small, recording of information to be fixed is difficult since the reactive liquid crystal molecules cannot be sufficiently oriented at the time of recording information. On the other hand, when the ratio of the reactive liquid crystal molecules to the photoresponsive molecules is too small, multiplex recording is difficult in some cases.

In an aspect of the invention, as mentioned above, the reactive liquid crystal molecules are preferably capable of polymerizing or crosslinking upon irradiation of light during information recording in the recording layer. When such reactive crystal molecules are used, recording and fixation of information may be conducted substantially simultaneously, and the constitution of a hologram recording instrument that records and reproduces information with the hologram recording medium may be simplified.

However, the reactive liquid crystal molecules may alternatively be capable of being polymerized and/or crosslinked by external stimuli other than light irradiated during information recording in the recording layer, as necessary. In this case, since it is possible to freely select whether the information once recorded is to be fixed or not depending on the importance of the recorded information or the like, the recording medium according to an aspect of the invention may be used as a rewritable recording medium. Therefore, both of rewritable media and write-once media may be provided according to aspects of the invention.

Furthermore, when the reactive liquid crystal molecules used in the recording layer can be copolymerized and/or crosslinked upon irradiation of light, a photopolymerization initiator may be contained in the recording layer in order to accelerate the polymerization and/or crosslinking.

When the reactive liquid crystal is used as the liquid crystal molecules, it is preferable to use additionally a photopolymerization initiator. The content of photopolymerization initiator in the recording layer (that is, in the recording material) is not particularly restricted. However, when the recording layer includes a photopolymerization initiator that promotes the polymerization and/or crosslinking of the reactive liquid crystal molecules upon irradiation of light when information is recorded in the recording layer, the content ratio of the photopolymerization initiator to the reactive liquid crystal molecules is preferably in the range of 0.01 to 10% by weight and more preferably in the range of 0.01 to 5% by weight.

When the content of the photopolymerization initiator is too high, the polymerization and/or crosslinking of the reactive liquid crystal molecules proceed before the reactive liquid crystal molecules are oriented sufficiently according to the orientation of the photoresponsive molecules at the time of irradiation of light; accordingly, high recording performance cannot be obtained in some cases. Furthermore, when the content of the photopolymerization initiator is too low, since the polymerization of the reactive liquid crystal molecules that are oriented according to the orientation of the photoresponsive molecules does not occur sufficiently fast at the time of irradiation of light, relaxation of the orientation of once-oriented reactive liquid crystal molecules occurs with time, resulting in deterioration of the fixability of information in some cases.

-Constitution of Hologram Recording Medium-

In the next place, a constitution of the recording medium according to an aspect of the invention and materials to be used will be more detailed.

The recording medium according to an aspect of the invention includes at least a recording layer including a recording material, the recording material including photoresponsive molecules, liquid crystal molecules and particles such as mentioned above. The recording layer may be provided on a substrate (or base). A reflective layer may be disposed between the recording layer and the substrate. Furthermore, a protective layer that protects the recording layer may be disposed on the surface on the side of the recording layer opposite to the side at which the substrate is disposed. The protective layer may be a substrate (that is, a constitution in which a recording layer is sandwiched between a pair of substrates). In addition, in order to, for example, secure the adhesiveness between the substrate and the reflective layer or the recording layer, or between the respective layers of the reflective layer, the recording layer and the protective layer, an intermediate layer may be disposed as necessary. Still furthermore, an anti-reflective coating may be applied on a portion at which such a coating is necessary, such as on the surface of the protective layer.

The shape of the hologram recording medium is not particularly restricted. As far as the recording layer has a constant thickness and is formed two-dimensionally, an arbitrary shape such as a disc, sheet, tape or drum shape may be selected.

However, a disc shape with a hole at the center portion, which is used in conventional optical recording media, is preferred since the shape allows readily utilization of production technology and recording/reproduction systems for conventional optical recording media.

(Recording Layer)

The recording layer includes photoresponsive molecules, liquid crystal molecules and particles, and may include other components as necessary. Furthermore, when the reactive liquid crystal molecules are used as the liquid crystal molecules, the recording layer may include the hologram recording material according to an aspect of the invention, which may include a photopolymerization initiator or the like as necessary. As other components, materials that do have direct relationship with recording/reproduction of information, such as binders, may be used.

The film thickness of the recording layer may be in the range of 3 µm to 2 mm from practical viewpoints. However, when the recording medium according to an aspect of the invention is a plane hologram, the film thickness is preferably in the range of 3 to 100 µm and more preferably in the range of 5 to 20 µm. On the other hand, when the recording medium according to an aspect of the invention is a volume hologram, the film thickness is preferably in the range of 100 µm to 2 mm and more preferably in the range of 250 µm to 1 mm.

In the following, respective components contained in the recording layer will be detailed.

-Photoresponsive Molecules-

As the photoresponsive molecules, a material that includes a partial structure that shows an isomerization reaction (such as cis-trans isomerization or syn-anti isomerization) when light is irradiated and changes its molecular orientation owing to the isomerization of the partial structure may be used.

In an aspect of the invention, the photoresponsive molecule may include an azobenzene skeleton (a structure having a benzene ring at each end of an azo group), which undergoes cis-trans isomerization under irradiation of light. A cis-trans isomerization reaction of such an azobenzene skeleton is depicted in the isomerization reaction example 1 shown below.

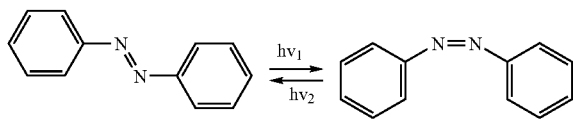

ISOMERIZATION REACTION EXAMPLE 1

Furthermore, when the photoresponsive molecule is a polymer (photoresponsive polymer), the polymer may have a photoisomerizable group including, for example, an azobenzene skeleton, in a side chain portion. The photoisomerizable group refers to a group that undergoes an isomerization reaction when light is irradiated. Such a polymer material allows variety of molecular designs for each of the main chain structure and side chain structure. Accordingly, there is an advantage in that various physical properties necessary for holographic recording such as absorption coefficient, responsive wavelength region, response speed and record retainability may be readily controlled to desired values at a high level.

For instance, when, in addition to the photoisomerizable group, a liquid crystalline linear mesogen group such as a biphenyl derivative is introduced in a side chain, orientation change caused by irradiation of the photoisomerizable group with light may be intensified and fixed; consequently, absorption loss may be reduced.

Examples of polymers that include an azobenzene skeleton or the like include polymer materials described in Japanese Patent Application Nos. 2004-150801, 2004-113463, 2004-163889, 2004-83716, 2004-81670, 2004-135949, 2004-135950 and 2004-81610.

In the following, as an example of the photoresponsive polymer used in an aspect of the invention, an example of the chemical structural formula of a photoresponsive polymer in which a photoisomerizable group including an azobenzene skeleton or the like is contained in a side chain portion (hereinafter occasionally referred to azopolymer (1)) is shown below. In the chemical structural formula below, n denotes an integer of 1 or greater.

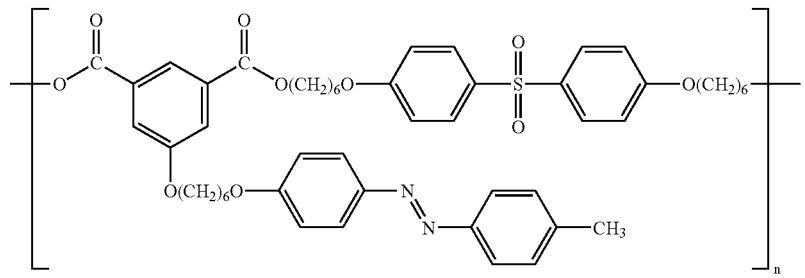

Azopolymer (1)

Furthermore, other than those including an azobenzene skeleton, the photoresponsive molecules may be a material that includes diaryl ethenes. Diaryl ethenes exhibit photochromism. Such photochromism is a $6\pi$ electron ring reaction in which the conversion is caused by light only, as in the case of fulgide. Diarylethenes can be considered to be a kind of stilbene. The photochromism of the diarylethenes is trans-cis isomerization, and thermal stability of each isomer state and durability against repeated conversions are high. The chemical structural formula of a typical diarylethene and an example of its isomerization reaction (Isomerization Reaction Example 2) are shown below.

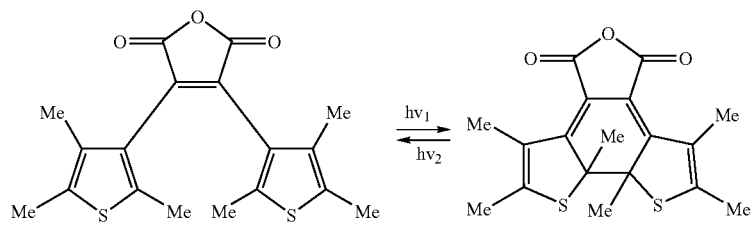

ISOMERIZATION REACTION EXAMPLE 2

For example, a hologram recording medium having a recording layer made of a material in which diarylethene is dispersed in polyvinyl alcohol (PVA) or polymethylmethacrylate (PMMA) becomes colorless when light having a wavelength of about 500 nm is irradiated, and assumes a color when light having a wavelength of about 360 nm is irradiated. Hologram recording may be performed by use of such a change in the absorption.

Furthermore, a material including spiropyran may also be used as the photoresponsive material. Spiropyrans are a kind of photochromic compound that has been researched and reported most intensively. Some of spiropyrans have already been put in practice, and spiropyrans are one of the most promising compounds. The chemical structural formula of a typical spiropyran and an example of its isomerization reaction (Isomerization Reaction Example 3) are shown below.

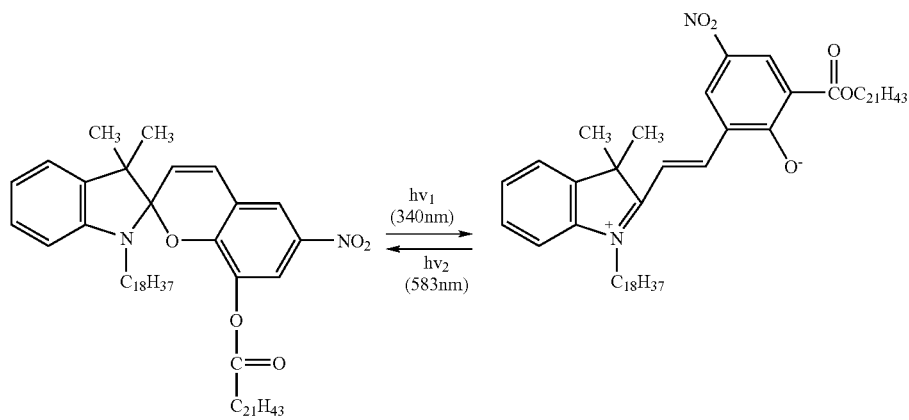

ISOMERIZATION REACTION EXAMPLE 3

Spiropyrans show blue color with good contrast when irradiated with light. Spiropyran-containing polymer materials are generally have the following features: (i) colorless material is converted to colored material by irradiation of UV light; (ii) the coloring speed is high; and (iii) fading of color when left in the dark is slow. Spiropyrans with such characteristics may be used as the photoresponsive material for the hologram recording medium according to an aspect of the invention.

Other examples of the photoresponsive compound include xanthene dyes such as uranine, Erythrosine B and Eosine Y The chemical structural formula of a typical xanthene dye, uranine, and an example of its isomerization reaction (Isomerization Reaction Example 4) are shown below. When a xanthene dye is used, information can be recorded in a hologram recording medium even with the intensity of light is relatively low. When the hologram recording medium is produced using a xanthene dye, a material in which the xanthene dye is dispersed in, for instance, PVA or PMMA may be used.

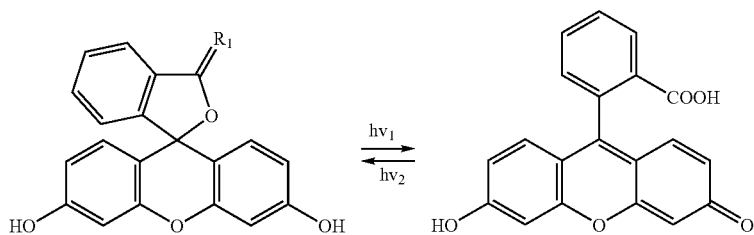

ISOMERIZATION REACTION EXAMPLE 4

Furthermore, a material including fulgide may be used as well as the photoresponsive material. The chemical structural formula of typical fulgide and an example of its isomerization reaction (Isomerization Reaction Example 5) are shown below. Fulgide colors upon application of ultraviolet light having a wavelength of 365 nm, and is isomerized upon application of green light having a wavelength of 515 nm or 532 nm. Thus, such characteristics may be utilized for making a hologram recording medium using fulgide.

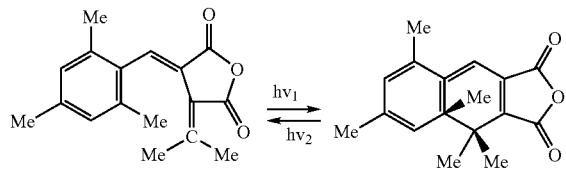

ISOMERIZATION REACTION EXAMPLE 5

When the photoresponsive molecule that is used in an aspect of the invention is a polymer material including a photochromic compound other than a material having an azobenzene skeleton, examples include materials described in Japanese Patent Application No. 2004-81666. Furthermore, as other photoresponsive molecules, materials disclosed in Japanese Patent Application Nos. 2003-298936, 2003-300059, 2003-300057, 2004-88790 and 2004-91983 can be cited.

-Liquid Crystal Molecules-

The reactive liquid crystal molecules used in an aspect of the invention are not particularly restricted as far as they can be polymerized and/or crosslinked by application of external stimulation such as light or heat. The reactive liquid crystal molecules may be capable of being polymerized and/or crosslinked by application of light.

The reactive liquid crystal molecules are a liquid crystal compound that has a skeleton selected from various kinds of skeletons showing nematic, cholesteric or smectic liquid crystalline orientations, also has at least one polymerizable functional group at a terminal thereof. The polymerizable functional group may be an unsaturated double bond such as an acryloyl group, a methacryloyl group or a vinyl group or an epoxy group. The reactive liquid crystal molecule may have two or more polymerizable functional groups and allows crosslinking. The orientation may be fixed further strongly by use of such a reactive liquid crystal molecule.

Examples of ring units as a mesogen group showing liquid crystalline orientation include biphenyls, phenyl benzoates, phenylcyclohexanes, phenylpyrimidines, diphenylacetylenes, diphenylbenzoates, bicyclohexanes, cyclohexylbenzenes and terphenyls. Terminals of the ring units may have a substituent such as a cyano group, an alkyl group, an alkoxy group or a halogen group.

Furthermore, as the non-reactive liquid crystal molecules that are used in an aspect of the invention, known liquid crystal materials may be used. For instance, liquid crystal molecules obtained by removing reactive groups that participate in polymerization and/or crosslinking from the above-mentioned reactive liquid crystal molecules may be used.

The liquid crystal molecules used in the recording material may include only one kind of liquid crystal molecule or two or more kinds of liquid crystal molecule. Furthermore, after undergoing an orientation process, the liquid crystal molecules are usually crosslinked and/or polymerized by light or heat in an appropriate method, whereby a polymer is formed.

-Photopolymerization Initiator-

When the reactive liquid crystal molecule is used as the liquid crystal molecule, a photopolymerization initiator may be used in order to promote the polymerization and/or crosslinking of reactive liquid crystal molecules contained in the recording layer including a recording material.

As the photopolymerization initiator, ordinary photopolymerization initiators such as acetophenone photoinitiators such as 2,2-diethoxy acetophenone, benzoin photoinitiators, benzophenone photoinitiators, titanocene photoinitiators, thioxanthone photoinitiators, diazonium photoinitiators, sulfonium salt photoinitiators, iodonium salt photoinitiators or selenium salt photoinitiators may be used. As the photopolymerization initiator, those which can be dissolved in or is compatible with the reactive liquid crystal molecules or the photoresponsive molecules are preferred in order to suppress adverse effects of light scattering. Furthermore, a transparent photopolymerization initiator is also preferred. For instance, IRGACURE 784, 754, 184, 651 and 369 (trade name, produced by Ciba Specialty Chemicals Co.) can be cited.

In the recording material, besides the photopolymerization initiator, a sensitizer may be added within a range that does not disturb the advantages of aspects of the invention. The content of photopolymerization initiator is generally in the range of 0.001 to 10% by weight and preferably in the range of 0.1 to 5% by weight, based on the weight of the recording material according to an aspect of the invention.

-Other Components (e.g., Binders)-

In the recording material that constitute the recording medium, as necessary, other components such as a binder resin may be contained.

As such a binder resin, for instance, polymethacrylate (PMMA) or polyvinyl alcohol (PVA) excellent in the optical properties may be used. Furthermore, a polyester material having a cyanobiphenyl group in a side chain such as shown in a chemical structural formula (1) below is also preferable as a binder resin.

Chemical Structural Formula (1)

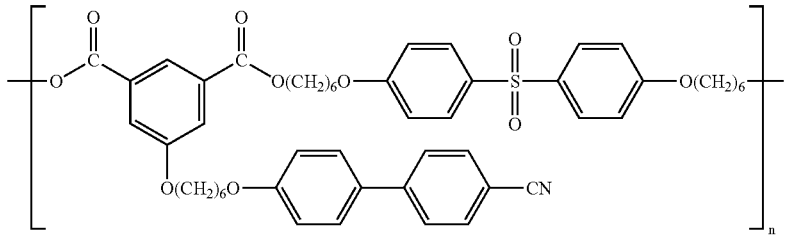

In the chemical structural formula (1), n denotes an integer of 1 or greater. The polyester material has light transmitting property in a wavelength region of light that is generally used when information is recorded in or reproduced from a hologram recording medium. Furthermore, when a photoresponsive polymer having a photoisomerizable group is used together with the polyester represented by the chemical structural formula (1), birefringence is induced following the isomerization of the photoisomerizable group; accordingly, higher sensitivity of the photoresponsive polymer may be effectively obtained. The scope of the expression "a photoresponsive polymer having a photoisomerizable group is used together with the polyester represented by the chemical structural formula (1)" includes not only physical mixing of the photoresponsive polymer having a photoisomerizable group and the polyester material represented by the chemical structural formula (1), but also chemical mixing, that is, a case where repeating units represented by the chemical structural formula (1) is included in the photoresponsive polymer having a photoisomerizable group (to form a copolymer).

-Formation of Recording Layer-

The formation of recording layer may be conducted by a method that is appropriately selected from known methods in accordance with the kind of the recording material according to an aspect of the invention to be used as the recording layer material. For instance, a liquid phase layer forming method such as a spraying method, a spin coating method, a dipping method, a roll coating method, a blade coating method, a doctor roll method or a screen printing method, in which a coating liquid containing the recording material according to an aspect of the invention dissolved and dispersed therein, or a vapor deposition method may be used. Furthermore, a planar recording layer (thick film) may be formed by using injection molding or hot pressing.

(Substrate/Base)

As a substrate or base, the material to be used may be arbitrarily selected from various materials that have a smooth surface. For instance, metal, ceramics, resin or paper may be used. Furthermore, the shape thereof is not particularly restricted. It is preferable to use a flat disc substrate with a hole at the center portion thereof such as those used in conventional optical recording media since use of such a substrate allows easy utilization of conventional production methods for optical recording media and conventional recording/reproduction systems.

Specific examples of such substrate materials include: glass; polycarbonate; acrylic resins such as polymethacrylate; vinyl chloride resins such as polyvinyl chloride and polyvinyl chloride copolymers; epoxy resins; amorphous polyolefins; polyesters; and metals such as aluminum. A combination of materials selected from the above may also be used as necessary.

Among the above-cited materials, amorphous polyolefin and polycarbonate are preferred, and polycarbonate is most preferred from the viewpoints of the humidity resistance, dimensional stability and low cost.

Furthermore, on a surface of the substrate, a tracking guide groove or an irregularity (pregroove) expressing information such as address signals may be provided.

When light is irradiated through the substrate into the recording layer at the time of recording or reproduction, a material that allows transmission of light within the wavelength range of the light to be used (recording light and reproduction light) is used. In this case, the transmittance in the wavelength region of light to be used (in the case of laser light, at or near the intensity peak wavelength region) may be 90% or more.

When a reflective layer is disposed on a surface of the substrate, an undercoat layer may be provided on the surface of the substrate in order to improve the planarity and the adhesiveness.

Examples of the material of the undercoat layer include polymers such as polymethyl methacrylate, acrylic acid-methacrylic acid copolymer, styrene-maleic anhydride copolymer, polyvinyl alcohol, N-methyol acrylamide, styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene, and polycarbonate; and surface modifiers such as silane coupling agents.

The undercoat layer may be formed by dissolving or dispersing the material for the undercoat layer in an appropriate solvent to prepare a coating liquid, and applying the coating liquid onto a surface of a substrate by a coating method such as a spin coating method, a dip coating method or an extrusion coating method. The thickness of the undercoat layer is preferably in the range of 0.005 to 20 µm in general, and more preferably in the range of 0.01 to 10 µm.

(Reflective Layer)

The reflective layer may be made of a light reflective material whose reflectance to laser light is 70% or more. Example of such light reflective materials include metals or semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi or stainless steel.

In an exemplary embodiment, only one light reflective material is used. In another exemplary embodiment, a combination of two or more light reflective materials is used. In another exemplary embodiment, an alloy of two or more light reflective materials is used. Among these, Cr, Ni, Pt, Cu, Ag, Au, Al and stainless steel are preferable, Au, Ag, Al and alloys thereof are more preferable, and Au, Ag and alloys thereof are still more preferable.

The reflective layer may be formed on a substrate by vapor depositing, sputtering or ion plating the light reflective material. The thickness of the reflective layer is preferably in the range of 10 to 300 nm in general, and preferably in the range of 50 to 200 nm.

(Protective Layer)

The material for the protective layer may be a known material that has a thickness at which the material can mechanically, physically and chemically protect the recording layer under a normal usage environment. For instance, in general, transparent resins and transparent inorganic materials such as $SiO_2$ can be cited.

At the recording or reproduction, when light is irradiated through the protective layer into the recording layer, the protective layer material should transmit light within the wavelength region of the light to be used. In this case, the transmittance in the wavelength region of light to be used (in the case of laser light, at or near the intensity peak wavelength region) may be 90% or more. This also applies in the case of the intermediate layer that is optionally disposed on the surface on the incident light side of the recording layer for improving the adhesiveness.

When the protective layer is made of a resin, a resinous film made of polycarbonate, cellulose triacetate or the like that has previously been formed in sheet form may be used. The protective layer may be formed by laminating the resinous film on the recording layer. The lamination may be achieved by using a thermosetting or UV-curable adhesive in order to secure the adhesion strength, followed by curing the adhesive by applying heat or irradiating UV-ray. The thickness of the resin film to be used as a protective layer is not particularly restricted as far as the protective layer can protect the recording layer. However, from the practical viewpoint, it is preferably in the range of 30 to 200 µm and more preferably in the range of 50 to 150 µm.

Alternatively, in place of such a resinous film, a thermoplastic resin, thermosetting resin, photo-curable resin or the like may be coated to form a protective layer. Furthermore, as necessary, an anti-reflective coating may be applied onto the protective layer.

Furthermore, when the protective layer is made of a transparent ceramics or glass material such as $SiO_2$, $MgF_2$, $SnO_2$, or $Si_3N_4$, the protective layer may be formed by using a sputtering method or sol-gel method. The thickness of the transparent inorganic material formed as a protective layer is not particularly restricted as far as protection of the recording layer is achieved. Practically, it is preferably in the range of 0.1 to 100 µm and more preferably in the range of 1 to 20 µm.

(Production Method of Recording Medium)

In the next place, a production method of a hologram recording medium according to an aspect of the invention, which has a constitution such as mentioned above, will be described.

When the hologram recording medium according to an aspect of the invention is a plane hologram, it may be produced by sequentially laminating one or more layers including a recording layer on a substrate in accordance with the kinds of material to be used for the respective layers as mentioned above. As an example, a main flow of production processes of a hologram recording medium having a structure including a recording layer and a protective layer provided on a substrate will be briefly described. First, a recording layer having a desired thickness is formed by spin coating a coating liquid on a polycarbonate substrate, the coating liquid including photoresponsive molecules made of a polymer, liquid crystal molecules, particles and one or more other optional components dissolved in a solvent, and the recording layer is sufficiently dried. Then, the recording layer and a cellulose triacetate resin film for forming a protective layer are adhered using a double-sided adhesive tape, so that a hologram recording medium is obtained which has a constitution of protective layer/recording layer/substrate.

Furthermore, when the hologram recording medium according to an aspect of the invention is a volume hologram, a recording layer may be formed by injection molding or hot pressing. Specifically, the volume hologram may be prepared through the following process.

When injection molding is used, a hologram recording medium may be prepared in such a manner as described below. First, a disc-like molded body that will become a recording layer is prepared by injection molding. Then, the disc-like molded body is sandwiched between a pair of disc-like transparent substrates, followed by hot pressing to conduct hot-melt adhesion.

In the injection molding process, a raw material resin (a resin composition including at least photoresponsive molecules, liquid crystal molecules and particles) is heated to be melt, and the molten resin is ejected into a forming die to form a disc. The injection molding machine to be used may be either an in-line injection molding machine in which the function of plasticizing the raw material and the ejection function are integrated or a pre-plunger injection molding machine in which the function of plasticizing the raw material and the ejection function are separated. Regarding the conditions for injection molding, the injection pressure is preferably from 1000 to 3000 $kg/cm^2$; and the injection speed is preferably from 5 to 30 mm/sec.

Furthermore, in the hot pressing process, the thick planar molded body obtained in the injection molding process is sandwiched between a pair of disc-like transparent substrates, and hot pressing is conducted in vacuum.

Since thus prepared hologram recording medium is not formed by forming a recording layer on a substrate, but is formed by injection molding separately and independently from the substrate, the thickness of the recording layer can be readily increased, and this method is suitable for mass production. Furthermore, since the recording layer is adhered to the substrate by hot pressing, the residual strain of a molded body generated during the injection molding can be made uniform; accordingly, even when the recording layer is made thicker, the recording characteristics is not deteriorated by light absorption or scattering.

On the other hand, when hot pressing is applied, a hologram recording medium may be prepared, for example, as follows. First, a powdery resin (a resin composition including at least photoresponsive molecules, liquid crystal molecules and particles) is sandwiched between substrates (pressing members) high in mold-releasing property such as TEFRON® sheet, and the powdery resin is hot-pressed under vacuum to directly form a recording layer.

The hot pressing process may involve vacuum hot pressing. In the vacuum hot pressing, the powdery resin as a sample is filled between a pair of pressing members. Then, the pressure is reduced to approximately 0.1 MPa in order to prevent generation of air bubbles, and the temperature is gradually increase to a predetermined temperature at such a low pressure, and the sample is pressed by the pressing members. In hot pressing, heating temperature may be equal to or higher than the glass transition temperature (Tg) of the resin material, and the pressure at the pressing may be from 0.01 to 0.1 $t/cm^2$. After the hot pressing is conducted for a predetermined time, application of heat and pressure is stopped, the sample is cooled to room temperature, and then is taken out.

By applying such hot pressing, the resin material sandwiched between the pair of pressing members is heated and melted. After cooling of the resin material, a planar recording layer can be obtained. When the pressing members are finally removed, an optical recording medium can be obtained. For instance, when a recording layer is formed of an azopolymer, the recording layer can be easily formed into a desired thickness through hot pressing at approximately 70° C. since Tg of the azopolymer is as low as approximately 50° C. Furthermore, the hot pressing does not create residual strain.

As necessary, a protective layer or the like may be disposed to improve the scratch resistance and moisture resistance of the hologram recording medium having the recording layer.

In this process, the recording layer is not formed by forming the recording layer on a substrate, but is separately and independently formed by hot pressing. Therefore, it is easy to increase the thickness of the thus prepared hologram recording medium. Furthermore, since the recording layer is formed by hot pressing, residual strain is not generated in the molded body, and the recording characteristics are not deteriorated by light absorption and scattering even when the recording layer is made thicker.

<Hologram Recording Method>

In the next place, a hologram recording method that uses the hologram recording medium according to an aspect of the invention will be described. According to the hologram recording method according to an aspect of the invention, information can be recorded in the recording layer of the recording medium according to an aspect of the invention or information once recorded can be reproduced by irradiating the recording medium with light. In an aspect of the invention, information recording may be multiplex recording using polarized light. In this case, high-sensitivity multiplex recording may be realized. Furthermore, when reactive liquid crystal molecules are used as the liquid crystal molecules, fixation of information once recorded is also possible. Further, since polarized light is used, it is also possible to lock the recorded data or conduct calculation based on the recorded data.

In the next place, an optical recording and/or reproduction instrument that records and/or reproduces information with the hologram recording medium according to an aspect of the invention described above will be described. The optical recording and/or reproduction instrument used in an aspect of the invention may have a constitution in which a known recording/reproduction method such as hologram recording or optical absorbance modulation recording is applied in consideration of the specification of the hologram recording medium used in the recording and/or reproduction. In particular, the optical recording and/or reproduction instrument used in an aspect of the invention may have a configuration that utilizes hologram recording using polarized light.

In this case, the optical recording and/or reproduction instrument used in an aspect of the invention may include at least a signal light source that irradiates a hologram recording medium with signal light corresponding to information when information is recorded in the hologram recording medium and a reference light source that irradiates the hologram recording medium with reference light when information recorded in the hologram recording medium is reproduced (read). Furthermore, the optical recording and/or reproduction instrument may be equipped with a read sensor (for instance, CCD) that uses a photoelectric conversion element that reads information (reproduced light or diffracted light) reproduced by irradiation of the hologram recording medium with the reference light.

Still furthermore, as necessary, the signal light source, or the reference light source and the read sensor, may be omitted to make an instrument exclusively for recording or exclusively for reproduction.

Usually, it is possible to apply various optical systems such as those used in ordinary optical recording and/or reproduction instruments as necessary. For example, an imaging optical system that irradiates signal light onto the hologram recording medium is formed by using a mirror, a beam splitter, a lens, and the like. In another example, the signal light and the reference light can be taken out of the same light source by using a beam splitter or the like.

Furthermore, the light sources for the signal light and/or the reference light are not particularly restricted. Usually, a known laser light source such as a He—Ne laser or an Ar laser may be used. Also usable is a light source having a bright line spectrum that is not so completely monochromatic as laser light but has such a narrow spectrum half-value width of approximately 2 to 3 nm (e.g., a very-high pressure mercury lamp). A white light source such as sun or a fluorescent lamp is also usable.

Furthermore, when a hologram recording medium to be used is a so-called disc-like medium such as commercially available DVDs or CD-ROMs, the instrument may be equipped with various mechanisms compatible with disc media used in DVD. CD-ROM or the like—for example, a mechanism such as a motor that holds and rotates the disc, and a mechanism that irradiates a predetermined position in the plane direction of the disc with the signal light or the reference light (when the light source is a fixed type, a galvanomirror or the like may be used or the light source may be set in a so-called head capable of moving in a planar direction of the disc).

Examples of the hologram recording method include: hologram recording in which plural holograms can be recorded at one position by changing the angle between a normal line to the recording plane and the incident object light; and hologram recording in which plural holograms are recorded in an overlapped region by changing the position of the incident light relative to the recording plane.

In the following, an example of an optical recording/reproduction instrument used in an aspect of the invention is described with reference to the drawing.

As shown in FIG. 1, in recording/reproduction, a 532 nm oscillation line of a solid-state laser 20 excited by a laser diode is used. Linearly polarized light emitted from the solid-state laser is divided by a polarized light beam splitter 22 into two light waves of signal light and reference light after rotation of its polarization by a half wavelength plate 21. Here, the intensity balance between the two light waves may be controlled by adjusting the angle of rotation of the polarized light. The two light waves intersect with each other in a recording medium 24 and, the optical anisotropy corresponding to the intensity distribution or polarization distribution generated by the interference of the two light waves is induced in the recording medium 24. A half-wavelength plate 33 on the signal light path controls the polarization of the signal light, and thereby an intensity-modulated hologram in which the polarization directions of the signal light and the reference light are parallel or a polarization-modulated hologram in which the polarization directions of the signal light and the reference light are orthogonal to each other can be recorded.

At reproduction, only the reference light is irradiated to the optical recording medium, so that diffracted light due to the recorded information can be obtained and the optical output thereof can be measured with a power meter 25. The diffraction efficiency of the optical recording medium may be calculated by determining the ratio of the intensity of the diffracted light to the intensity of the reference light.

In the optical recording and/or reproduction instrument used in an aspect of the invention, a recording medium according to an aspect of the invention may be disposed as the recording medium 24 to carry out recording and/or reproduction of information. When a recording medium using an azopolymer as the photoresponsive molecule is used, not only an intensity-modulated hologram where polarization directions of the signal light and reference light are parallel but also a polarization-modulated hologram where polarization directions thereof are orthogonal to each other can be recorded by controlling the half-wavelength plate 33 or the polarized light beam splitter 22.

EXAMPLES

In the following, the present invention will be more detailed with reference to examples. However, the invention is not restricted to the examples shown below.

<Preparation of Recording Medium>

Example 1

Reactive liquid crystal monomer (trade name: UCL008, produced by Dainippon Ink and Chemicals Co., Ltd.): 55 parts by mass Azopolymer (1) (weight average molecular weight: 23000): 35 parts by mass Colloid particles ($TiO_2$, average particle diameter 15 nm): 10 parts by mass Photopolymerization initiator (trade name: IRGACURE 784, produced by Ciba Specialty Chemicals Co., Ltd.): 0.03 parts by mass A solution obtained by dissolving the above-mentioned components in THF (tetrahydrofuran) is applied onto one surface of a cleaned disc-like glass substrate (diameter: 50 mm, thickness: 1 mm) by spin coating, and is dried to form a recording layer having a thickness of 2 µm, whereby a recording medium A1 is prepared.

Example 2

Reactive liquid crystal monomer (trade name: UCL008, produced by Dainippon Ink and Chemicals Co., Ltd.): 40 parts by mass
Azopolymer (1) (weight average molecular weight: 23000): 55 parts by mass
Colloid particles ($SiO_2$, average particle diameter 15 nm): 5 parts by mass
Photopolymerization initiator (trade name: IRGACURE 784, produced by Ciba Specialty Chemicals Co., Ltd.): 0.03 parts by mass A solution obtained by dissolving the above-mentioned components in THF (tetrahydrofuran) is applied onto one surface of a cleaned disc-like glass substrate (similar to that of example 1) by spin coating, and is dried to form a recording layer having a thickness of 2 µm, whereby a recording medium A2 is prepared.

Example 3

Reactive liquid crystal monomer (trade name: UCL008, produced by Dainippon Ink and Chemicals Co., Ltd.): 40 parts by mass
Azopolymer (1) (weight average molecular weight: 23000): 59.5 parts by mass
Colloid particles ($TiO_2$, average particle diameter 15 nm): 0.5 parts by mass
Photopolymerization initiator (trade name: IRGACURE 784, produced by Ciba Specialty Chemicals Co., Ltd.): 0.03 parts by mass A solution obtained by dissolving the above-mentioned components in THF (tetrahydrofuran) is applied onto one surface of a cleaned disc-like glass substrate (similar to that in example 1) by spin coating, and is dried to form a recording layer having a thickness of 2 µm, whereby a recording medium A3 is prepared.

Example 4

Reactive liquid crystal monomer (trade name: UCL008, produced by Dainippon Ink and Chemicals Co., Ltd.): 6 parts by mass
Azopolymer (1) (weight average molecular weight: 23000): 93 parts by mass
Colloid particles ($TiO_2$, average particle diameter 15 nm): 1 parts by mass
Photopolymerization initiator (trade name: IRGACURE 784, produced by Ciba Specialty Chemicals Co., Ltd.): 0.03 parts by mass A solution obtained by dissolving the above-mentioned components in THF (tetrahydrofuran) is applied onto one surface of a cleaned disc-like glass substrate (similar to that in example 1) by spin coating, and is dried to form a recording layer having a thickness of 2 µm, whereby a recording medium A4 is prepared.

Comparative Example 1

Reactive liquid crystal monomer (trade name: UCL008, produced by Dainippon Ink and Chemicals Co., Ltd.): 40 parts by mass
Azopolymer (1) (weight average molecular weight: 23000): 59.5 parts by mass
Colloid particles ($TiO_2$, average particle diameter 100 nm): 0.5 parts by mass
Photopolymerization initiator (trade name: IRGACURE 784, produced by Ciba Specialty Chemicals Co., Ltd.): 0.03 parts by mass A solution obtained by dissolving the above-mentioned components in THF (tetrahydrofuran) is applied onto one surface of a cleaned disc-like glass substrate (similar to that of example 1) by spin coating, and is dried to form a recording layer having a thickness of 2 µm, whereby a recording medium B1 is prepared.

Comparative Example 2

Reactive liquid crystal monomer (trade name: UCL008, produced by Dainippon Ink and Chemicals Co., Ltd.): 40 parts by mass
Azopolymer (1) (weight average molecular weight: 23000): 60 parts by mass
Photopolymerization initiator (trade name: IRGACURE 784, produced by Ciba Specialty Chemicals Co., Ltd.): 0.03 parts by mass A solution obtained by dissolving the above-mentioned components in THF (tetrahydrofuran) is applied onto one surface of a cleaned disc-like glass substrate (similar to that of example 1) by spin coating, and is dried to form a recording layer having a thickness of 2 µm, whereby a recording medium B2 is prepared.

Comparative Example 3

Reactive liquid crystal monomer (trade name: UCL008, produced by Dainippon Ink and Chemicals Co., Ltd.): 6 parts by mass
Azopolymer (1) (weight average molecular weight: 23000): 94 parts by mass
Photopolymerization initiator (trade name: IRGACURE 784, produced by Ciba Specialty Chemicals Co., Ltd.): 0.03 parts by mass A solution obtained by dissolving the above-mentioned components in THF (tetrahydrofuran) is applied onto one surface of a cleaned disc-like glass substrate (similar to that of example 1) by spin coating, and is dried to form a recording layer having a thickness of 2 µm, whereby a recording medium B3 is prepared.

<Evaluation of Transmittance>

Light transmittance is measured immediately after and one month after the preparation of the recording medium to evaluate initial and time-dependent deteriorations of the recording characteristics caused by light scattering. Assuming that an Ar laser is used as the light source for recording information, an Ar laser is used to evaluate the transmittance.

In the evaluation, first, an Ar laser light (wavelength: 515 nm, intensity: 0.5 W/cm$^2$) is irradiated from the recording layer side of the recording medium in a direction perpendicular to the plane of the recording medium. The transmittance is determined by the ratio of the intensity of the laser light after transmission through the recording medium to the intensity of the laser light before entering the recording medium. Here, the intensity of the laser light is measured with a power meter (produced by Advantest Corp.). The transmittance is obtained by calculating the average value of measured values for three arbitrary points on the plane of the recording medium. The results are shown in Table 1.

TABLE 1

| | Composition of Recording Material | | | | | Transmittance Evaluation Result with Ar Laser (515 nm) | | | | |
|---|---|---|---|---|---|---|---|---|---|---|
| | Liquid Crystal Molecule (parts by mass) | Azopolymer (parts by mass) | Colloid Particle | | | Transmittance A immediate after Preparation | | Transmittance B One Month After Preparation (%) | Decrease in Transmittance $(1 - B/A) \times 100$ | |
| | | | Addition Amount (parts by mass) | Average Particle Diameter (nm) | Material | (%) | Judgment | | (%) | Judgment |
| Example 1 | 55 | 35 | 10 | 15 | $TiO_2$ | 72 | B | 71 | 1 | A |
| Example 2 | 40 | 55 | 5 | 15 | $SiO_2$ | 63 | B | 64 | −2 | A |
| Example 3 | 40 | 59.5 | 0.5 | 15 | $TiO_2$ | 60 | B | 60 | 0 | A |
| Example 4 | 6 | 93 | 1 | 15 | $TiO_2$ | 70 | B | 70 | 0 | A |
| Comparative Example 1 | 40 | 59.5 | 0.5 | 100 | $TiO_2$ | 20 | D | 10 | 50 | D |
| Comparative Example 2 | 40 | 60 | 0 | — | — | 60 | B | 15 | 75 | D |
| Comparative Example 3 | 6 | 94 | 0 | — | — | 70 | B | 24 | 65 | D |

Criteria for judgment of the transmittance immediate after the preparation and decrease of the transmittance shown in Table 1 are as follows.

-Transmittance Immediate After Preparation-

A: 80% or more

B: 60% or more but less than 80%

C: 40% or more but less than 60%

D: less than 40%

-Decrease in Transmittance-

A: 5% or less

B: more than 5% but 20% or less

C: more than 20% but 40% or less

D: more than 40%

What is claimed is:

1. A hologram recording material for recording information by at least irradiation with light, the hologram recording material comprising
   photoresponsive molecules,
   reactive liquid crystal molecules comprising polymerizable functional groups at terminals of the molecules,
   a photopolymerization initiator, and
   particles of silica or a resin having an average particle diameter of from 15 nm to 40 nm, wherein
   a ratio of the particles to the liquid crystal molecules is from about 0.1% to 5% by weight.

2. The hologram recording material of claim 1, wherein a content of the liquid crystal molecules in the recording material is about 5% by weight or more.

3. The hologram recording material of claim 1, wherein each of the photoresponsive molecules is a photoresponsive polymer.

4. The hologram recording material of claim 3, wherein the photoresponsive polymer has a photoisomerizable group including an azobenzene skeleton, in a side chain.

5. The hologram recording material of claim 4, wherein the photoresponsive polymer is represented by Azopolymer (1)

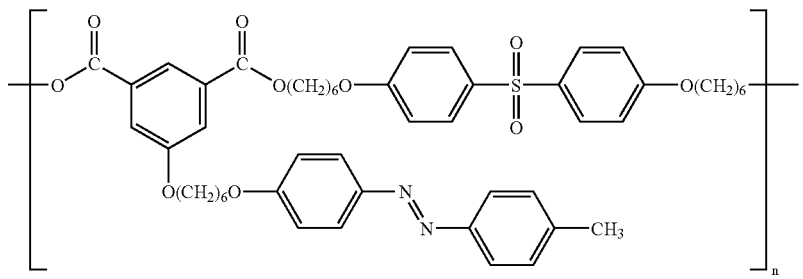

Azopolymer (1)

wherein, in Azopolymer (1), n denotes an integer of 1 or greater.

6. The hologram recording material of claim 1, wherein a content ratio of the photoresponsive molecules to the reactive liquid crystal molecules is in a range of 1:9 to 9:1 by weight.

7. The hologram recording material of claim 1, wherein a content ratio of the photopolymerization initiator to the reactive liquid crystal molecules is in a range of 0.01 to 10% by weight.

8. A hologram recording medium for recording information by at least irradiation with light, the hologram recording medium comprising a recording layer that comprises a hologram recording material, the hologram recording material comprising
   photoresponsive molecules,
   reactive liquid crystal molecules comprising polymerizable functional groups at terminals of the molecules,
   a photopolymerization initiator, and particles of silica or a resin having an average particle diameter of from 15 nm to 40 nm, wherein
a ratio of the particles to the liquid crystal molecules is from about 0.1% to 5 % by weight.

9. The hologram recording medium of claim 8, wherein a content of the liquid crystal molecules in the recording material is about 5% by weight or more.

10. The hologram recording medium of claim 8, wherein each of the photoresponsive molecules is a photoresponsive polymer.

11. The hologram recording medium of claim 10, wherein the photoresponsive polymer has a photoisomerizable group including an azobenzene skeleton, in a side chain.

12. The hologram recording medium of claim 11, wherein the photoresponsive polymer is represented by Azopolymer (1)

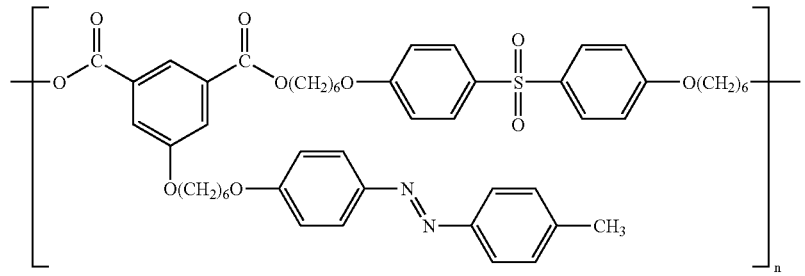

Azopolymer (1)

wherein, in Azopolymer (1), n denotes an integer of 1 or greater.

13. The hologram recording medium of claim 8, wherein a content ratio of the photoresponsive molecules to the reactive liquid crystal molecules is in a range of 1:9 to 9:1 by weight.

14. The hologram recording medium of claim 8, wherein a content ratio of the photopolymerization initiator to the reactive liquid crystal molecules is in a range of 0.01 to 10% by weight.

15. A hologram recording method comprising
conducting multiplex recording of information by using at least one of intensity modulation or polarization modulation of light when a signal light and a reference light are simultaneously irradiated to a hologram recording medium to record information,
the hologram recording medium having a recording layer including photoresponsive molecules, reactive liquid crystal molecules comprising polymerizable functional groups at terminals of the molecules, a photopolymerization initiator, and particles of silica or a resin, and
an average particle diameter of the particles being from 15 nm to 40 nm, wherein
a ratio of the particles to the liquid crystal molecules is from about 0.1% to 5 % by weight.

16. The hologram recording material of claim 1, wherein the polymerizable functional groups are at least one member selected from the group consisting of acryloyl groups, methacryloyl groups, vinyl groups, and epoxy groups.

17. The hologram recording medium of claim 8, wherein the polymerizable functional groups are at least one member selected from the group consisting of acryloyl groups, methacryloyl groups, vinyl groups, and epoxy groups.

18. The hologram recording method of claim 15, wherein the polymerizable functional groups are at least one member selected from the group consisting of acryloyl groups, methacryloyl groups, vinyl groups, and epoxy groups.

19. The hologram recording method of claim 15, wherein a content ratio of the photoresponsive molecules to the reactive liquid crystal molecules is in a range of 1:9 to 9:1 by weight.

20. The hologram recording method of claim 15, wherein a content ratio of the photopolymerization initiator to the reactive liquid crystal molecules is in a range of 0.01 to 10% by weight.

21. The hologram recording method of claim 15, wherein each of the photoresponsive molecules is a photoresponsive polymer that has a photoisomerizable group including an azobenzene skeleton in a side chain portion and is represented by Azopolymer (1)

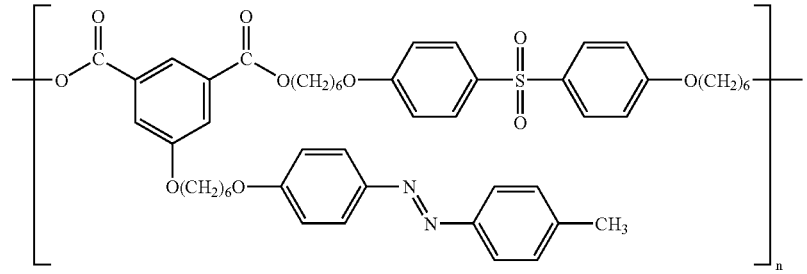

Azopolymer (1)

wherein, in Azopolymer (1), n denotes an integer of 1 or greater.

* * * * *